3,011,278
MECHANICAL EARTH MOLE
Calvin H. Lust, Apopka, Fla., assignor to Lust Farms, Apopka, Fla., a partnership
Filed Dec. 14, 1960, Ser. No. 75,698
7 Claims. (Cl. 37—193)

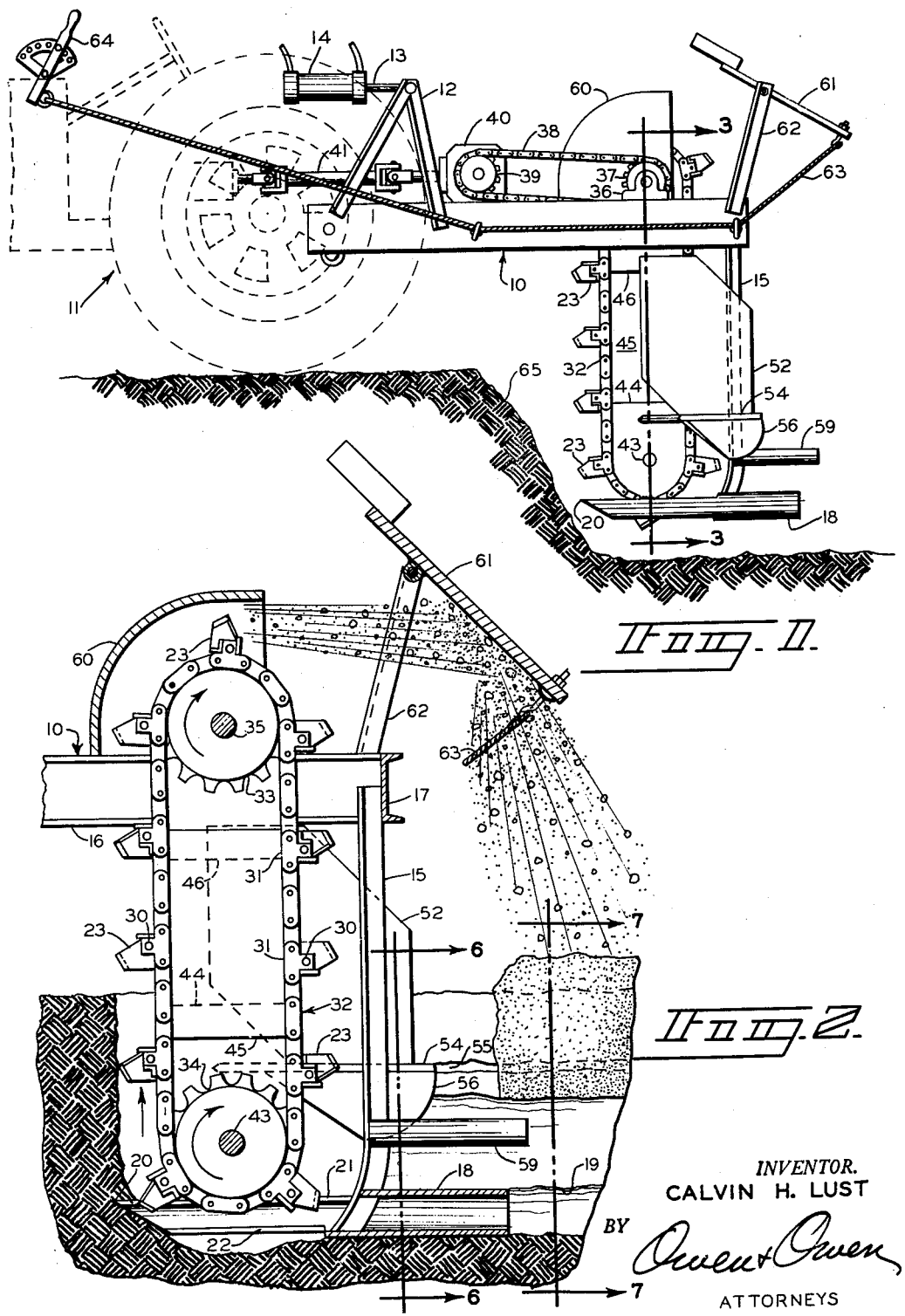

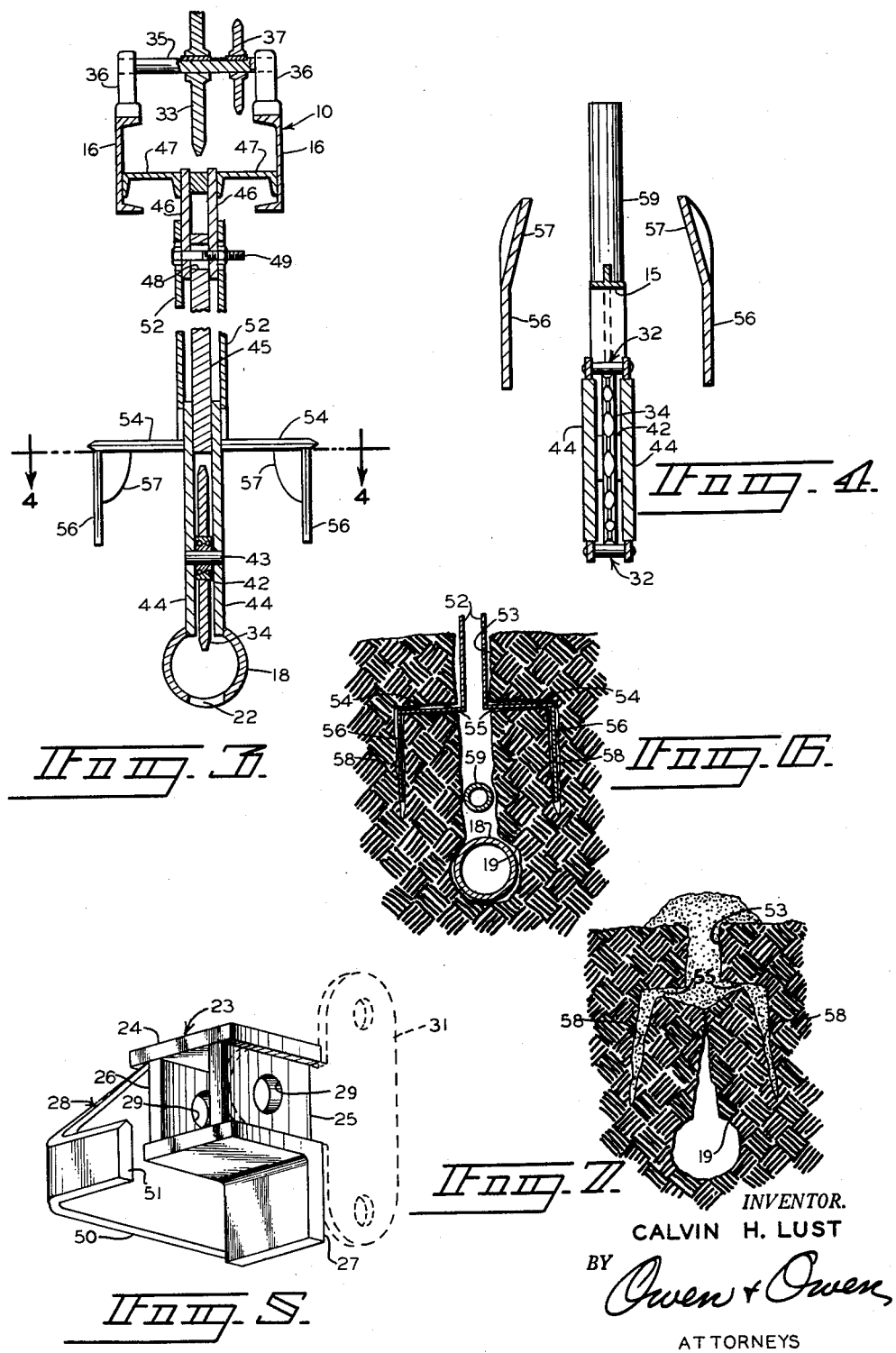

This invention relates to an apparatus for continuously forming a sub-surface passage through the earth and may conveniently be called a mechanical earth mole. The apparatus is designed and operated for the purpose of continuously forming a continuous tunnel or small covered passage through the earth at a distance below the surface and finds its greatest utility in the digging of irrigation tunnels through earth of the type which can be compacted so that the tunnels will remain open for at least one growing season.

In earth such as the bogs used by commercial growers of vegetables, the laying of tile for irrigation purposes is somewhat less than satisfactory and has been found to be a considerable expense. An apparatus embodying the invention, i.e., a mechanical earth mole, can be operated to continuously dig passages at a yearly cost far less than the annular cost of a tile irrigation system. The annual re-digging or re-forming of the irrigation passages also permits their redesign and rearrangement at the beginning of each growing season depending upon the particular crop to be raised in the earth under treatment.

It is therefore the principal object of the instant invention to provide an apparatus which can be mounted upon and moved by a surface vehicle such as a tractor or other prime mover, and which will continuously dig and form a passage through the earth at a level beneath its surface.

This and other objects and advantages will be better understood from the specification which follows and from the drawings in which:

FIG. 1 is a view in elevation of an apparatus embodying the invention shown in position preparatory to entering the earth;

FIG. 2 is a fragmentary view partly in section and partly in elevation, and shown on an enlarged scale, of the functional parts of the apparatus illustrated in FIG. 1.

FIG. 3 is a fragmentary, vertical sectional view taken along the line 3—3 of FIG. 1, and shown on an enlarged scale;

FIG. 4 is a fragmentary, horizontal, sectional view taken along the line 4—4 of FIG. 3 and shown on a further enlarged scale;

FIG. 5 is a view in perspective of a digging member utilized in an apparatus embodying the invention for actually digging through the earth;

FIG. 6 is a fragmentary vertical sectional view taken along the line 6—6 of FIG. 2; and FIG. 7 is a fragmentary, vertical, sectional view taken along the line 7—7 of FIG. 2.

An apparatus embodying the invention comprises a main support boom 10 removably mounted upon and extending generally horizontally from a surface vehicle such as a tractor shown in dotted lines in FIG. 1 and indicated generally by the reference number 11. The boom 10 may, for example, be pivotally connected to a part of the frame of the tractor 11 and linked to and supported by the tractor 11 through the medium of an A frame 12 attached to a rod 13 of a cylinder 14 so that by energizing the cylinder 14, the boom 10 may be swung upwardly to lift the entire apparatus above the surface upon which the tractor 11 runs.

The functional portions of an apparatus embodying the invention are mounted upon and supported by the boom 10 and a downwardly extending support bar 15 which is rigidly attached to the rear end of the boom 10. In the embodiment of the invention illustrated in the drawings, the boom 10 is formed by a pair of parallel channels 16 and a cross-channel 17 (FIG. 2) at their rear ends. The support bar 15 is welded or otherwise rigidly secured to the parallel channels 16 and cross channel 17. The support bar 15 mounts a horizontally extending former 18 at its lower end. The former 18 in the embodiment shown is a tubular element having a cross section at least generally corresponding to the cross section of the passage through the earth to be formed by operation of the apparatus. FIGS. 6 and 7 illustrate how the former 18 forms the main part of the passage, indicated generally by the reference number 19.

The former 18 is welded or otherwise rigidly secured on the lower end of the support bar 15 and, as mentioned, is shown as being tubular. At its front end the former 18 is cut at an angle forming an upper penetrating edge 20 which is driven into the earth by the movement of the tractor 11. The wall of the former 18 is slotted at its top and bottom, the upper slot 21 and lower slot 22 being vertically aligned and extending from the front end of the former 18 back to about the point of connection to the support bar 15.

The slots 21 and 22 are wide enough to provide for the entry into and departure out of the front portion of the former 18, of a series of digging members 23. Each of the digging members 23 (FIG. 5) comprises a flat top plate 24, two spaced vertical plates 25 and 26, an angle plate 27 and a blade 28. The two vertical plates 25 and 26 are pierced with horizontally aligned openings 29 for the reception of a mounting pin 30 (see FIG. 2) by which the particular digging member 23 is attached to its mounting link 31. Each of the mounting links 31 is a part of a continuous digging chain 32 which is mounted on and driven by a pair of sprockets 33 and 34. The sprocket 33 (see FIGS. 1–3) is keyed on a jack shaft 35 mounted in journals 36 which are supported by the two side channels 16 of the boom 10.

A driven sprocket 37 is also keyed on the shaft 35 and is engaged with a driving chain 38 which is, in turn, engaged with an output sprocket 39 of a gear box 40. The gear box 40 is driven in turn by a take-off shaft 41 coupled to or extending rearwardly from, the engine of the tractor 11.

The lower sprocket 34 is mounted by a bearing 42 on a pin 43 which is secured in a pair of parallel plates 44 welded at their upper ends to a center plate 45 which constitutes a part of frame for supporting the digging apparatus. The center plate 45 is supported by a pair of upper parallel plates 46 which in turn are welded or otherwise mounted from a horizontal channel 47 extending between the side channels 16. The center plate 45 has a vertical slot 48 near its upper end and a heavy bolt 49 extends through the slot 48 and through openings in the upper plates 46 so that the plate 45 may be adjusted vertically relative to the upper plates 46 to provide for adjustment of the tension on the digging chain 32.

The digging member 23 (FIG. 5) also includes the angle plate 27 and the blade 28. The angle plate 27 is welded to the spaced vertical plates 25 and 26 and the blade 28 is welded to the vertical plate 26 and edges of the angle plate 27 for rigidity. The blade 28 consists of two portions, a side member 50 and a cross bar 51. That portion of the side 50 which extends out from beneath the top plate 24 has a downwardly inclined edge which is sharp and the upper edge of the cross bar 51 is sharp, the two edges forming an inclined and cross cutting edge to cut away the earth as the digging member 23 is pulled through the earth by the digging chain 32. As can be seen by reference to FIG. 2 the side 50 and the cross bar 51 are alternated from side to side of the successive ones of the digging members 23.

A pair of vertical side plates 52 are welded to the bottom edges of the upper plates 46 and the upper edges of the bottom plates 44, extending vertically from a level above the surface of the earth downwardly to a level below the surface but above the depth of the passage to be formed. The side plates 52 function to hold open the vertical slot through the earth, designated in FIG. 6 with reference number 53, which is cut by the upwardly moving digging members at the front of the apparatus, serving also to slightly compact the side walls of the slot 53.

At the level of the bottom edges of the side plates 52, there is located a pair of horizontally extending "swept" wings 54. The leading edges of the wings 54 are sharpened to form cutting blades so that the forward movement of the apparatus cuts a pair of horizontal slits 55 (see FIGS. 6 and 7) through the earth connected at their inner-edges to the vertical slot 53. At the outboard edges of each of the wings 54 there is a downwardly extending vertical vane 56, the leading edges of the vanes 56 being inclined backwardly. At their rear portions, the vanes 56 have inwardly bent sections 57. The vanes 56 cut vertical slits 58 through the earth, parallel to and spaced equidistantly from opposite sides of, the vertical slot 53, the vertical slits 58 being continuously connected at their upper edges to the horizontal slits 55 along lines determined by the joining corners of the wings 54 and vanes 56.

The apparatus may also have a rearwardly extending former guard 59 welded or secured to the support bar 15 at a level somewhat above the former 18.

When the apparatus is moved through the earth and the power is applied to the sprocket 33, the digging members 23 are moved through a path extending upwardly at the front of the machine to dig the earth away forming the vertical slot 53 as the machine moves along. The digging members 23 lift that portion of the loosened earth which falls upon their top plates 24 and carry the earth upwardly and over the upper sprocket 33. A hood 60 may be mounted on the boom 10 at the forward quadrant around the upper sprocket 33 to prevent any of the earth from flying off of the digging members 23 toward the front of the machine. As the digging members 23 are carried around the upper sprocket 33 their speed is sufficiently high to throw the loosened earth backwardly where it strikes an adjustable deflector 61 supported on struts 62 and connected by a cable 63 to a hand lever 64 conveniently mounted on the tractor 11. Adjustment of the angle of the deflector 61 determines where the loosened earth falls back down to close the slot 53.

The digging members 23 then continue downwardly with their chain 32 through the upper slot 21 and into the interior of the forward end of the former 18 cleaning out the loosened earth and again exiting from the former 18 through the front part of the slot 21 to start upwardly to cut away the earth.

As the apparatus continues to move through the earth the wings 54 cut the horizontal slits 55 and the vanes 56 cut the vertical slits 58. As the slits 55 and 58 are cut, the inwardly bent sections 57 of the vanes 56 fold the two portions of the earth outlined by the slot 53 and slits 55 and 58 inwardly toward each other. This action is illustrated in FIG. 7. The former guard 59 prevents the complete collapse of the earth being folded inwardly by the sections 57. As these two sections of earth are folded inwardly into contact with each other the loosened earth deflected downwardly from the deflector 61 falls into the upper part of the slot 53 and some particles fall into and seal the now deformed slits 55 and 58 with the folded in sections of earth closing the slot 53 beneath the level of contact, to leave the passage 19 with a lower tubular part approximately conforming to the outside cross section of the former 18 and a narrow, lower remainder of the slot 53.

As is illustrated in FIG. 1, the mechanical earth mole embodying the invention most conveniently enters the earth by being driven into the side wall of a main, open irrigation channel, generally indicated by the reference number 65.

I claim:

1. Apparatus for continuously forming a sub-surface passage through earth, said apparatus comprising, in combination, a boom adapted to be mounted on and extend generally horizontally from a vehicle that runs on the surface, a frame extending downwardly from said boom to the depth of the passage to be formed, a horizontally extending former secured at the lower end of said frame, said former being tubular and having a cross-section at least generally corresponding to the cross-section of the passage to be formed and there being a slot in the upper front surface thereof, an excavator comprising a series of digging members and means for guiding said members through a closed path lying in a vertical plane and extending downwardly through such slot to approximately the level of the bottom of said former and upwardly through such slot near the front end of said former, means for driving said members along said path upwardly toward the surface at the front of said excavator for cutting a vertical slot through the earth extending upwardly from said former to the surface, and means following said excavator for replacing earth in part of such slot above said former.

2. A mechanical earth mole comprising, in combination, a boom adapted to be carried by a vehicle travelling on the surface of the earth and extending generally horizontally therefrom, a frame carried by said boom and extending downwardly therefrom to a level beneath the surface, a tubular former secured on said frame and extending horizontally, said former having an open front end and having a longitudinal slot in at least its upper wall, a continuous series of excavating blades, means for mounting said blades for movement along a path leading upwardly out of said former through said slot at a point near the front end of said former up through the earth to above the surface, downwardly toward and through said slot at a point rearward of the front of said former and forwardly through the interior of said former toward the front end of said former, and means driven from said vehicle for moving said blades through said path for lifting earth out of the front of said former and cutting a vertical slot through the earth ahead of and above said former as said earth mole is moved bodily forwardly by said vehicle.

3. A mechanical earth mole according to claim 2 and a pair of vertical side plates extending rearwardly at opposite sides of the downwardly extending portion of the path of said excavating blades from above said surface to beneath said surface, for holding the vertical slot open to a point rearwardly of the downward extending portion of such path.

4. A mechanical earth mole according to claim 2 and a pair of horizontally and oppositely extending wings located at a level beneath the surface but above said former, each of said horizontal wings having a downwardly extending vertical vane at its outer end, the rear portion of said vanes extending inwardly toward said side plates for compressing earth from both sides inwardly to close the vertical slot behind said side plates and above said former.

5. A mechanical earth mole according to claim 2 in which the continuous series of excavating blades is carried on a chain and the mounting means therefor comprises a sprocket mounted on a horizontal axis extending across the path of movement of said blades and journalled in said frame at a level relative to said former such that said blades move around said sprocket through the slot in said former.

6. A mechanical earth mole according to claim 2 in which each of said excavating blade includes a vertical cutting member and a horizontal earth lifting member.

7. A mechanical earth mole according to claim 2 and an earth deflector positioned above and rearwardly of the path of movement of said blades for deflecting earth thrown off said blades back into the vertical slot formed thereby at a point above the rear end of the former.

References Cited in the file of this patent

UNITED STATES PATENTS

| 516,750 | Blaine | Mar. 20, 1894 |
| 1,886,382 | Dunlap | Nov. 8, 1932 |
| 2,842,077 | Morrison | July 8, 1958 |

FOREIGN PATENTS

| 88,674 | Norway | Jan. 28, 1957 |
| 158,230 | Sweden | Mar. 19, 1957 |